(12) United States Patent
Plechinger et al.

(10) Patent No.: US 11,621,137 B2
(45) Date of Patent: Apr. 4, 2023

(54) ELECTRIC SWITCH WITH A THERMAL TRIGGER UNIT, AND METHOD FOR ADAPTING A THERMAL TRIGGER CURVE

(71) Applicant: Siemens Aktiengesellschaft, Munich (DE)

(72) Inventors: Ekkehard Plechinger, Roeckersbuehl (DE); Erwin Stangl, Amberg (DE); Reinhard Steger, Sulzbach-Rosenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/551,382

(22) Filed: Dec. 15, 2021

(65) Prior Publication Data

US 2022/0200266 A1    Jun. 23, 2022

(30) Foreign Application Priority Data

Dec. 21, 2020   (DE) .................... 10 2020 216 415.0

(51) Int. Cl.
| | |
|---|---|
| *H01H 71/74* | (2006.01) |
| *H02H 5/04* | (2006.01) |
| *H02H 3/00* | (2006.01) |
| *H01H 71/14* | (2006.01) |
| *H01H 71/16* | (2006.01) |

(52) U.S. Cl.
CPC ........ *H01H 71/7427* (2013.01); *H02H 3/006* (2013.01); *H02H 5/047* (2013.01); *H01H 71/14* (2013.01); *H01H 71/16* (2013.01)

(58) Field of Classification Search
CPC .............. H01H 71/74; H01H 71/7409; H01H 71/7418; H01H 71/7427; H01H 71/7436; H01H 71/0228; H02H 3/006; H02H 5/04; H02H 5/047
See application file for complete search history.

(56) References Cited

U.S. PATENT DOCUMENTS

| | | | |
|---|---|---|---|
| 2008/0012668 A1* | 1/2008 | Davison ................. | H02H 3/006 361/87 |
| 2013/0076479 A1* | 3/2013 | Maloney ................ | H01H 69/01 374/1 |
| 2014/0177118 A1 | 6/2014 | Elms et al. | |

* cited by examiner

*Primary Examiner* — Jared Fureman
*Assistant Examiner* — Christopher J Clark
(74) *Attorney, Agent, or Firm* — Harness, Dickey & Pierce, P.L.C.

(57) ABSTRACT

An electric switch includes a thermal tripping unit which, when a thermal budget acting on it is exceeded, trips and switches off the electric switch. In an embodiment, the tripping unit includes an adjustment module which, as a function of an accessory connected to the electric switch, uses an actuating element to set a tripping element of the thermal tripping unit such that the heat effect of the accessory is compensated for in the event of tripping.

20 Claims, 3 Drawing Sheets

ELECTRIC SWITCH WITH A THERMAL TRIGGER UNIT, AND METHOD FOR ADAPTING A THERMAL TRIGGER CURVE

PRIORITY STATEMENT

The present application hereby claims priority under 35 U.S.C. § 119 to German patent application number DE 102020216415.0 filed Dec. 21, 2020, the entire contents of which are hereby incorporated herein by reference.

FIELD

Example embodiments of the invention generally relate to an electric switch with a thermal tripping unit, and to a method for adapting a thermal tripping curve of an electric switch.

BACKGROUND

Thermal tripping units of protective devices, such as molded case circuit breakers (MCCB) or air circuit breakers (ACB) for example, are typically calibrated and sold without fitting or installing accessories. As soon as the customer fits external accessories or installs internal accessories, the heat balance on or in the electric switch may change.

The heat balance on or in the electric switch may change for the following reasons. Firstly, there may be an increase in the switch terminal temperature owing to increased contact transfer resistances, for example, when a plug-in base is used. Furthermore, there may be an increase in the switch housing temperature owing to active, heat-generating accessories such as, for example, motor drives, undervoltage releases or communications modules being fitted or installed.

There may also be an increase in the switch housing temperature owing to, for example, rotary drives or auxiliary switches being built on top of or blocking switch heat emission areas. The increase in the switch housing temperature may likewise be caused by the reduction in heat dissipation via connection rails, for example in the case of a plug-in base.

However, in contrast to increasing the switch housing temperature, there may also be a reduction in the switch housing temperature owing to accessories being fitted since accessories may also act as cooling areas or heat emission areas.

When the heat balance on or in the electric switch changes, this also has a direct influence on the thermal tripping units integrated in the electric switch. In the case of a temperature identified as being too high, the electric switch trips too early. In contrast to this, the electric switch trips too late in the case of a temperature identified as being too low.

Therefore, overall, accessories which influence the heat balance of the electric switch unintentionally and undesirably shift the thermal tripping curve of the electric switch.

SUMMARY

The inventors have discovered that one possible solution to this problem is to provide differently calibrated devices for different applications. Similarly, it is possible to attach a further scale or a further setting mark to the electric switch in the setting element for the tripping behavior in the case of fitted or installed accessories.

For full functionality of the electric switch, the inventors have discovered that the thermal tripping curve of its tripping unit would have to be adapted in accordance with the fitted or installed accessories.

At least one embodiment of the invention provides an electric switch which improves upon or even solves the problem of its heat balance being influenced by accessories and the thermal tripping curve being unintentionally and undesirably shifted.

Embodiments of the invention are directed to an electric switch and a method for adapting a thermal tripping curve. Advantageous refinements of the electric switch are specified in the claims.

At least one embodiment is directed to an electric switch comprising a thermal tripping unit which, when a thermal budget acting on it is exceeded, trips and switches off the electric switch, wherein the tripping unit comprises an adjustment module which, as a function of an accessory connected to the electric switch, uses an actuating element to set a tripping element of the thermal tripping unit such that the heat effect of the accessory is compensated for in the event of tripping.

The method according to at least one embodiment of the invention is for adapting a thermal tripping curve of an electric switch, for example one of the embodiments discussed herein, the method comprising:
fitting the at least one accessory to the electric switch; and
automatically or manually setting the tripping element using the actuating element of the adjustment module, so that the heat effect of the accessory is compensated for in the event of tripping.

An electric switch according to at least one embodiment of the invention comprises:
a thermal tripping unit, to trip and switch off the electric switch upon a thermal budget acting on the tripping unit being exceeded, the tripping unit including
an adjustment module to, as a function of at least one accessory connected to the electric switch, use an actuating element to set a tripping element of the thermal tripping unit to compensate for a heat effect of the at least one accessory in an event of tripping.

A method for adapting a thermal tripping curve of an electric switch, according to at least one embodiment of the invention, comprises:
fitting at least one accessory to the electric switch; and
automatically or manually setting a tripping element of the electric switch using an actuating element of an adjustment module of the electric switch, to compensate for a heat effect of the at least one accessory in an event of tripping of the electric switch.

BRIEF DESCRIPTION OF THE DRAWINGS

The above-described properties, features and advantages of this invention and the way in which they are achieved will become clearer and more distinctly comprehensible in connection with the following description of the example embodiments which are explained in more detail in connection with the drawings,
in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware. The module may include one or more interface circuits.

In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment is directed to an electric switch comprising a thermal tripping unit which, when a thermal budget acting on it is exceeded, trips and switches off the electric switch, wherein the tripping unit comprises an adjustment module which, as a function of an accessory connected to the electric switch, uses an actuating element to set a tripping element of the thermal tripping unit such that the heat effect of the accessory is compensated for in the event of tripping.

One advantage of the electric switch according to at least one embodiment of the invention is that the thermal tripping curve is matched to accessories when accessories are used. When the accessories are removed, the tripping curve returns to the original shape. Therefore, the tripping method of the electric switch is matched to the respective situation, irrespective of the accessory used.

In one refinement of the electric switch according to at least one embodiment of the invention, the adjustment module is mechanically or electrically connected or connected by radio to the at least one accessory and the actuating element is automatically set by this connection such that the heat effect of the accessory is compensated for in the event of tripping.

In an alternative refinement of the electric switch according to the invention, at least one operating element is provided on the adjustment module and the heat effect of the at least one accessory is manually compensated for in the event of tripping via the operating element being operated. The operating element may be embodied as a DIP switch.

In one refinement of the electric switch according to at least one embodiment of the invention, the tripping element is embodied as a bimetallic trip device. The actuating element may act on the bimetallic trip device. The actuating element may laterally displace or rotationally bend the bimetallic trip device. The bimetallic trip device may interact with a tripping shaft of the electric switch for tripping purposes.

In one refinement of at least one embodiment, the electric switch is connected to an accessory which heats up the electric switch, and the actuating element increases the distance between the bimetallic trip device and the tripping shaft. As an alternative, an accessory may be connected to the electric switch, which accessory draws heat from the electric switch, and the actuating element reduces the distance between the bimetallic trip device and the tripping shaft.

In a further refinement of at least one embodiment of the electric switch, the at least one accessory is an external front-side, an integrated or an external rear-side accessory. The method according to at least one embodiment of the invention for adapting a thermal tripping curve of an electric switch, for example one of the embodiments discussed herein, comprises:
  fitting the at least one accessory to the electric switch; and
  automatically or manually setting the tripping element using the actuating element of the adjustment module, so that the heat effect of the accessory is compensated for in the event of tripping.

Figure 1:
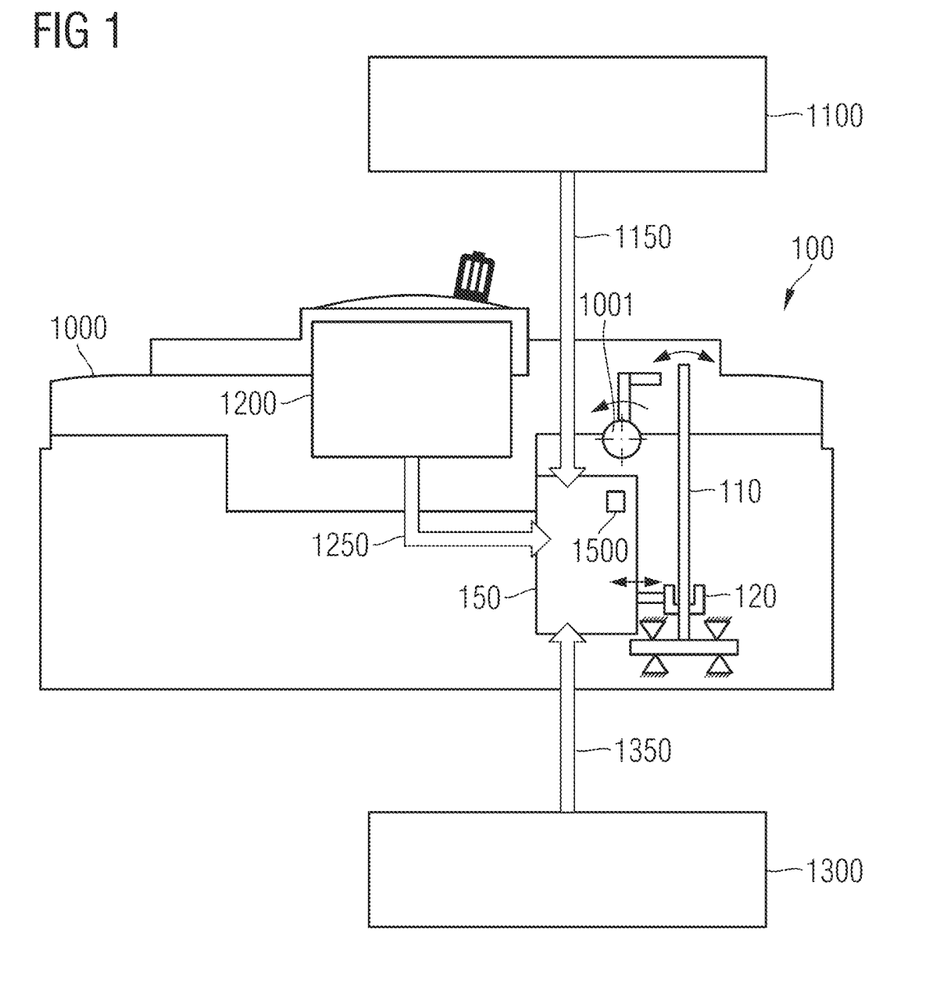
FIG. 1: shows an electric switch with an adjustment module and accessories.

FIG. 1 illustrates an electric switch according to the invention with a thermal tripping unit 100. The thermal tripping unit 100 trips when a thermal budget acting on it is exceeded and in this way switches off the electric switch 1000. The tripping unit 100 comprises an adjustment module 150 which, as a function of an accessory 1100; 1200; 1300 connected to the electric switch 1000, uses an actuating element 120 to set a tripping element 110 of the thermal tripping unit 100 such that the heat effect of the accessory 1100; 1200; 1300 is compensated for in the event of tripping.

The adjustment module 150 may be mechanically or electrically connected or connected by radio to the at least one accessory 1100; 1200; 1300. The actuating element 120 is automatically set by this connection 1150; 1250; 1350 such that the heat effect of the accessory 1100; 1200; 1300 is compensated for in the event of tripping. The connections 1150; 1250; 1350 may be mechanical. For example, the information that accessories 1100; 1200; 1300 are fitted to or installed in the electric switch 1000 may be transmitted to the adjustment module 150 via mechanical rams.

As an alternative or in addition, an operating element 1500 may be provided on the adjustment module 150 and the heat effect of the at least one accessory 1100; 1200; 1300 is manually compensated for in the event of tripping via the operating element being operated. After a corresponding accessory 1100; 1200; 1300 is fitted to or in the electric switch 1000, the respective operating element 1500 on the adjustment module 150 has to be operated and in this way the adjustment module 150 has to be informed that a corresponding accessory 1100; 1200; 1300, which additionally heats up the switch or draws heat from the switch, is attached.

The operating element 1500 may be embodied as a DIP switch with the aid of which the installation or fitting state of the accessories 1100; 1200; 1300 is represented on the adjustment module 150 by way of a coding. The adjustment module 150 will adapt the thermal tripping curve in accordance with the coding.

In accordance with the illustration of FIG. 1, the tripping element 110 of the thermal tripping unit 100 may be embodied as a bimetallic trip device. The actuating element 120 of the adjustment module 150 acts on this bimetallic trip device. The actuating element 120 may laterally displace the bimetallic trip device. Similarly, a structural refinement by way of which the actuating element 120 rotationally bends the bimetallic trip device is conceivable.

The bimetallic trip device interacts with a tripping shaft 1001 of the electric switch 1000 for tripping purposes. Since the tip of the bimetallic trip device moves the tripping shaft 1001 to the left in the illustration of FIG. 1, the electric switch 1000 is tripped.

When an accessory 1100; 1200; 1300 is connected to the electric switch 1000, which accessory heats up the electric switch 1000, the actuating element 120 increases the distance between the bimetallic trip device and the tripping shaft 1001. In the case of an accessory 1100; 1200; 1300 which draws heat from the electric switch 1000, the actuating element 120 reduces the distance between the bimetallic trip device and the tripping shaft 1001.

In accordance with the illustration in FIG. 1, this means that, in the case of accessories 1100; 1200; 1300 which additionally heat up the switch, the bimetallic trip device is pushed away from the tripping shaft 1001 to the right. In the case of accessories 1100; 1200; 1300 which additionally guide heat away from the electric switch 1000, the bimetallic trip device is pushed toward the tripping shaft 1001, in accordance with the illustration in FIG. 1 pushed to the left.

If a plurality of accessories 1100; 1200; 1300 are connected to the electric switch 1000, the actuating movements of the actuating element 120 are added up and may possibly also cancel each other out.

The accessories 1100; 1200; 1300 installed on the switch may be an external front-side, an integrated or an external rear-side accessory. An external front-side accessory may be, for example, a motor drive, a rotary drive or a locking arrangement. Integrated accessories may be, for example, a communications module, an auxiliary switch or an undervoltage release. An external rear-side accessory may be, for example, a plug-in base.

Figure 2:
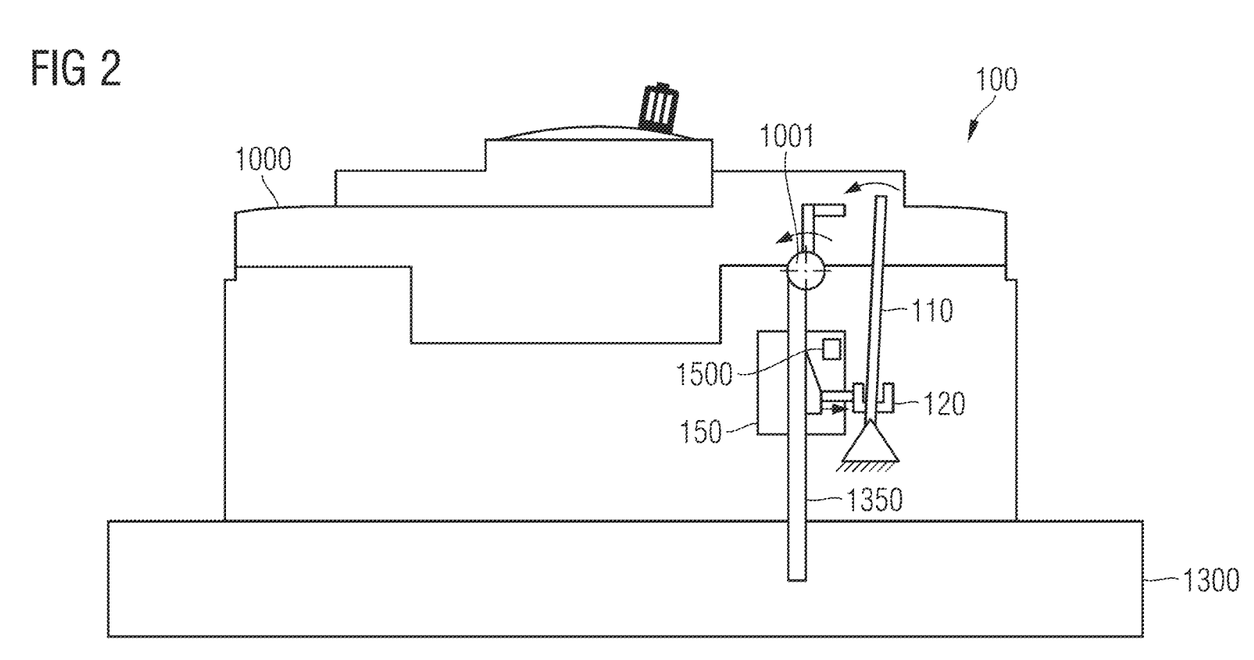
FIG. 2: shows an electric switch with an adjustment module and a plug-in base.

FIG. 2 illustrates the electric switch 1000 according to an embodiment of the invention with its thermal tripping unit 100 and adjustment module 150. The electric switch 1000 is mounted on a plug-in base as an accessory 1300; further accessories are not mounted on the electric switch 1000. The plug-in base as an accessory 1300 is connected to the adjustment module 150 by way of a connection 1350. The connection 1350 may be embodied, for example, as a mechanical ram.

Figure 3:
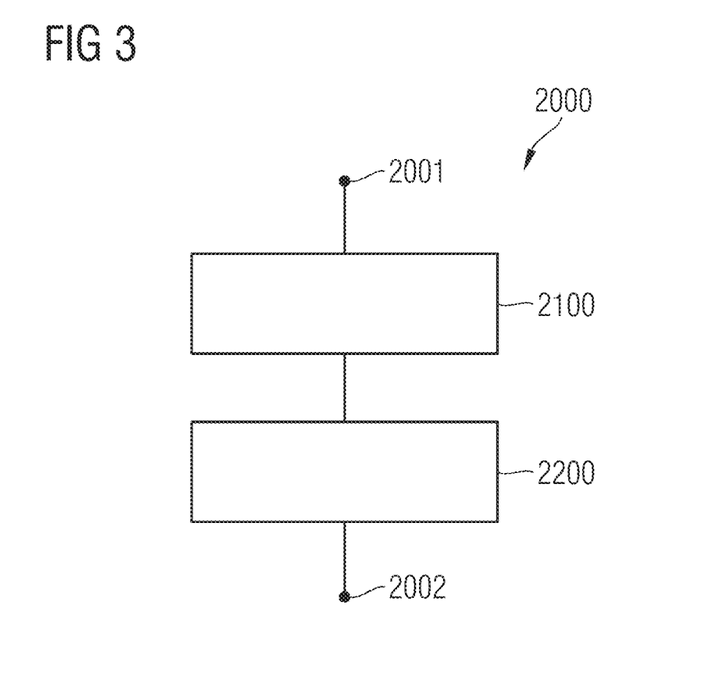
FIG. 3: shows a method for adapting a thermal tripping curve of an electric switch.

FIG. 3 shows a method 2000 of an embodiment for adapting a thermal tripping curve of an electric switch 1000. After the start 2001, the at least one accessory 1100; 1200; 1300 is fitted 2100 on the electric switch 1000 in a first step. In the second step, the tripping element 110 is automatically or manually set 2200 using the actuating element 120 of the adjustment module 150, so that the heat effect of the accessory 1100; 1200; 1300 is compensated for in the event of tripping. The method 2000 according to according to an embodiment of the invention concludes with the end 2002.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric switch comprising:
   a thermal tripping unit, to trip and switch off the electric switch upon a thermal budget acting on the tripping unit being exceeded, the tripping unit including
   an adjustment module to, as a function of at least one accessory connected to the electric switch, use an actuating element to set a tripping element of the thermal tripping unit to compensate for a heat effect of the at least one accessory in an event of tripping.

2. The electric switch of claim 1, wherein the adjustment module is mechanically or electrically connected or connected by radio to the at least one accessory and wherein the actuating element is automatically set by mechanic or electrical connection to compensate for the heat effect of the at least one accessory in the event of tripping.

3. The electric switch of claim 1, wherein the adjustment module includes at least one operating element and wherein the heat effect of the at least one accessory is manually compensated for in the event of tripping via operation of the at least one operating element.

4. The electric switch of claim 3, wherein the at least one operating element is embodied as a DIP switch.

5. The electric switch of claim 1, wherein the tripping element is embodied as a bimetallic trip device.

6. The electric switch of claim 5, wherein the at least one actuating element is configured to act on the bimetallic trip device.

7. The electric switch of claim 5, wherein the at least one actuating element is configured to laterally displace or rotationally bend the bimetallic trip device.

8. The electric switch of claim 5, wherein the bimetallic trip device is configured to interact with a tripping shaft of the electric switch for tripping.

9. The electric switch of claim 8, wherein the electric switch is connectable to the at least one accessory, the at least one accessory being configured to heat up the electric switch, and wherein the actuating element is configured to increase a distance between the bimetallic trip device and the tripping shaft.

10. The electric switch of claim 8, wherein the electric switch is connectable to the at least one accessory, the at least one accessory being configured to draw heat from the electric switch, and wherein the actuating element is configured to reduce a distance between the bimetallic trip device and the tripping shaft.

11. The electric switch of claim 1, wherein the at least one accessory is an external front-side accessory, an integrated rear-side accessory or an external rear-side accessory.

12. A method for adapting a thermal tripping curve of an electric switch, comprising:

fitting at least one accessory to the electric switch; and automatically or manually setting a tripping element of the electric switch using an actuating element of an adjustment module of the electric switch, to compensate for a heat effect of the at least one accessory in an event of tripping of the electric switch.

13. The electric switch of claim 2, wherein the adjustment module includes at least one operating element and wherein the heat effect of the at least one accessory is manually compensated for in the event of tripping via operation of the at least one operating element.

14. The electric switch of claim 13, wherein the at least one operating element is embodied as a DIP switch.

15. The electric switch of claim 2, wherein the tripping element is embodied as a bimetallic trip device.

16. The electric switch of claim 15, wherein the at least one actuating element is configured to act on the bimetallic trip device.

17. The electric switch of claim 15, wherein the at least one actuating element is configured to laterally displace or rotationally bend the bimetallic trip device.

18. The electric switch of claim 6, wherein the at least one actuating element is configured to laterally displace or rotationally bend the bimetallic trip device.

19. The electric switch of claim 6, wherein the bimetallic trip device is configured to interact with a tripping shaft of the electric switch for tripping.

20. The electric switch of claim 19, wherein the electric switch is connectable to the at least one accessory, the at least one accessory being configured to heat up the electric switch, and wherein the actuating element is configured to increase a distance between the bimetallic trip device and the tripping shaft.

\* \* \* \* \*